US010850377B2

(12) United States Patent
Steurer

(10) Patent No.: US 10,850,377 B2
(45) Date of Patent: Dec. 1, 2020

(54) HAND-HELD POWER TOOL, AND METHOD FOR OPERATION

(71) Applicant: Robert Bosch GmbH, Stuttgart (DE)

(72) Inventor: Christoph Steurer, Urbach (DE)

(73) Assignee: Robert Bosch GmbH, Stuttgart (DE)

( * ) Notice: Subject to any disclaimer, the term of this patent is extended or adjusted under 35 U.S.C. 154(b) by 476 days.

(21) Appl. No.: 14/673,755

(22) Filed: Mar. 30, 2015

(65) Prior Publication Data

US 2015/0273645 A1 Oct. 1, 2015

(30) Foreign Application Priority Data

Mar. 31, 2014 (DE) .................. 10 2014 206 076

(51) Int. Cl.
| | |
|---|---|
| *B23Q 17/22* | (2006.01) |
| *B25C 1/00* | (2006.01) |
| *B21J 15/10* | (2006.01) |
| *B21J 15/28* | (2006.01) |
| *B25F 5/00* | (2006.01) |

(52) U.S. Cl.
CPC ............ *B25C 1/008* (2013.01); *B21J 15/105* (2013.01); *B21J 15/28* (2013.01); *B25C 1/00* (2013.01); *B25F 5/00* (2013.01); *B23Q 17/22* (2013.01)

(58) Field of Classification Search
CPC ...... B25C 1/008; B23Q 17/22; B23Q 17/005; B23Q 17/2241; B23Q 11/0078; B23Q 11/0085; B21J 15/105; B21J 15/28; B25F 5/00
USPC .................... 227/7; 173/11, 13–17, 176, 177
See application file for complete search history.

(56) References Cited

U.S. PATENT DOCUMENTS

| | | | | |
|---|---|---|---|---|
| 2,405,033 A | * | 7/1946 | Grimes | B21J 15/08 219/150 R |
| 4,405,071 A | * | 9/1983 | Austin | B25C 1/008 227/132 |
| 4,741,467 A | * | 5/1988 | Gassner | B25C 1/184 227/8 |
| 5,984,020 A | * | 11/1999 | Meyer | B23D 45/16 173/171 |
| 6,471,106 B1 | * | 10/2002 | Reining | B25C 1/008 227/156 |
| 7,565,991 B2 | * | 7/2009 | Erhardt | B25C 1/06 227/10 |

(Continued)

FOREIGN PATENT DOCUMENTS

| | | |
|---|---|---|
| CN | 201298161 Y | 8/2009 |
| CN | 101676052 A | 3/2010 |

(Continued)

*Primary Examiner* — Stephen F. Gerrity
*Assistant Examiner* — Joshua G Kotis
(74) *Attorney, Agent, or Firm* — Maginot, Moore & Beck LLP

(57) ABSTRACT

A hand-held power tool, in particular a riveting machine, nailing machine, or drywall screwdriver, includes a device configured to detect a contact pressure of the hand-held power tool against a workpiece and an operating switch configured to manually activate the hand-held power tool. The hand-held power tool further includes a controller that monitors the contact pressure that is detected by the device starting from operation of the operating switch and activates the hand-held power tool when the detected contact pressure exceeds a prespecifiable limit value.

8 Claims, 1 Drawing Sheet

(56) References Cited

U.S. PATENT DOCUMENTS

| | | | | |
|---|---|---|---|---|
| 7,980,440 B2* | 7/2011 | Hahn | | B25C 1/08 123/46 SC |
| 8,042,717 B2* | 10/2011 | Lam | | B25C 1/008 227/120 |
| 2004/0003930 A1* | 1/2004 | Meixner | | B25D 11/125 173/48 |
| 2004/0187810 A1* | 9/2004 | Gschwend | | B25C 1/08 123/46 H |
| 2005/0220445 A1* | 10/2005 | Baskar | | B25C 1/06 388/811 |
| 2007/0008162 A1* | 1/2007 | Gossett | | B25C 7/00 340/680 |
| 2007/0045377 A1* | 3/2007 | Towfighi | | B25C 1/04 227/130 |
| 2007/0095149 A1* | 5/2007 | Sieber | | B24B 23/04 73/818 |
| 2007/0221697 A1* | 9/2007 | Gschwend | | B25C 1/08 227/10 |
| 2009/0200353 A1* | 8/2009 | Dittrich | | B25C 1/08 227/9 |
| 2009/0289094 A1* | 11/2009 | Schiestl | | B25C 1/06 227/8 |
| 2010/0001032 A1* | 1/2010 | Miescher | | B25C 1/06 227/8 |
| 2010/0032467 A1* | 2/2010 | Tanaka | | B25C 1/08 227/8 |
| 2010/0038395 A1* | 2/2010 | Krondorfer | | B25C 1/06 227/5 |
| 2010/0071920 A1* | 3/2010 | Lau | | B25F 5/00 173/1 |
| 2010/0116863 A1* | 5/2010 | Suda | | B25C 1/008 227/8 |
| 2010/0237124 A1* | 9/2010 | Shima | | B25C 1/06 227/8 |
| 2011/0084109 A1* | 4/2011 | Ford | | B25C 1/08 227/2 |
| 2011/0303428 A1* | 12/2011 | Roth | | B25C 1/06 173/1 |
| 2011/0303730 A1* | 12/2011 | Blessing | | B25C 1/003 227/146 |
| 2012/0104070 A1* | 5/2012 | Wu | | B25C 1/008 227/8 |
| 2014/0263535 A1* | 9/2014 | Rajani | | B25C 1/008 227/2 |
| 2015/0136829 A1* | 5/2015 | Howes | | B25C 1/008 227/140 |
| 2015/0251301 A1* | 9/2015 | Gerold | | B25C 1/08 73/11.01 |
| 2015/0283690 A1* | 10/2015 | Welte | | B25F 5/00 702/183 |
| 2015/0298307 A1* | 10/2015 | Wolf | | B25C 1/008 227/8 |
| 2015/0314432 A1* | 11/2015 | Yang | | B25C 1/04 227/8 |
| 2016/0136797 A1* | 5/2016 | Weigmann | | B25C 1/04 227/8 |
| 2016/0144495 A1* | 5/2016 | Raggl | | B25C 1/08 29/432 |

FOREIGN PATENT DOCUMENTS

| | | | | |
|---|---|---|---|---|
| CN | 102137742 A | 7/2011 | | |
| DE | 3543374 A1 * | 6/1987 | | B25C 1/06 |
| DE | 40 23 963 A1 | 1/1992 | | |
| DE | 10 2009 058 981 A1 | 6/2011 | | |
| DE | 10 2009 058 984 A1 | 6/2011 | | |
| DE | 102010062894 A1 * | 6/2012 | | B25C 5/15 |

* cited by examiner

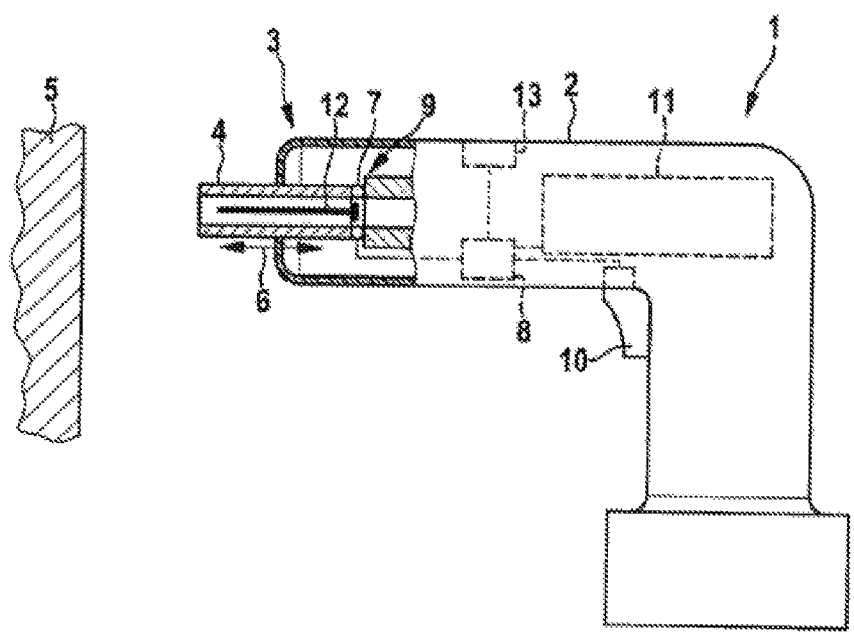

HAND-HELD POWER TOOL, AND METHOD FOR OPERATION

This application claims priority under 35 U.S.C. § 119 to patent application no. DE 10 2014 206 076.1, filed on Mar. 31, 2014 in Germany, the disclosure of which is incorporated herein by reference in its entirety.

BACKGROUND

The disclosure relates to a hand-held power tool, in particular a riveting machine, nailing machine or drywall screwdriver, comprising a device for detecting a contact pressure of the hand-held power tool against a workpiece, and comprising an operating switch for manually activating the hand-held power tool.

The disclosure further relates to a method for operating a hand-held power tool which has a device for detecting a contact pressure of the hand-held power tool against a workpiece and has an operating switch for manually activating the hand-held power tool.

Hand-held power tools and methods for operating hand-held power tools of the kind cited in introductory part are known from the prior art. For example, Published Specification DE 10 2009 058 981 A1 describes an apparatus for fitting fastening elements in the form of a riveting machine. The apparatus has a trigger as the operating switch, which trigger drives an electric motor and a gear mechanism of a drive unit by means of a control electronics system. An enable device is also provided, the said enable device allowing activation of the hand-held power tool by operation of the operating switch only when a sufficiently high contact pressure of the hand-held power tool against the workpiece has been detected by means of a pressure sensor.

SUMMARY

The hand-held power tool according to the disclosure has the advantage that operation for the purpose of activating the hand-held power tool is simplified for the user. Particularly when the hand-held power tool is in the form of a riveting machine or nailing machine, the design according to the disclosure makes it easier for the user to activate or fit several rivets or nails in succession several times. To this end, provision is made, according to the disclosure, for the hand-held power tool to have a controller which monitors the contact pressure which is detected by the device starting from operation of the operating switch, and activates the hand-held power tool when the detected contact pressure exceeds a prespecifiable limit value. This results in a machining process, in particular a riveting or nailing process, being automatically triggered when the hand-held power tool is pressed against the workpiece. One prerequisite for this is that the user operates the operating switch before pressing the hand-held power tool against the workpiece. As a result, it is possible for the user to keep the operating switch operated and to carry out several machining processes in succession by pressing the hand-held power tool against the workpiece several times at different locations on the workpiece. As a result, it is possible, for example, to insert a large number of rivets into the workpiece over a short period of time.

According to an advantageous development of the disclosure, provision is made for the hand-held power tool to have at least one acceleration sensor, wherein the controller activates the hand-held power tool only when the acceleration sensor does not detect any critical accelerations. It is possible to use the detection of accelerations of the hand-held power tool to draw conclusions in respect of whether the said hand-held power tool is being held steady or is still being moved. This increases the level of safety when using the hand-held power tool, in particular since faulty triggering or faulty activation of the hand-held power tool can be avoided as a result. It is assumed that the machining process which is to be carried out is also actually desired only when the hand-held power tool rests steadily on the workpiece. Protection of the hand-held power tools against misuse is also increased in this way.

The controller is, in particular, designed in such a way that it activates the hand-held power tool only when the acceleration sensor does not detect any accelerations. In this case, provision is therefore made for the machining process to be triggered only when the hand-held power tool is no longer being moved, in order to further increase safety.

According to an advantageous development of the disclosure, provision is made for the controller to have means for checking the functionality of the acceleration sensor and/or of the device, and to deactivate the hand-held power tool when a malfunction has been detected. If a defect in the device or in the acceleration sensor is identified, the hand-held power tool is automatically deactivated in order to ensure the safety of the user. As an alternative or in addition, provision is preferably made for a warning message to be displayed to the user, the said warning message informing the said user about the operational safety of the power tool. A warning device which outputs the warning message to the user in an acoustic or visual manner is preferably provided for this purpose.

The method according to the disclosure relates to the advantages already mentioned above. The said method is distinguished by the following steps: the operating switch is first monitored for operation. If operation of the operating switch is detected, the contact pressure which is detected by the device is monitored. If the contact pressure exceeds a prespecifiable limit value, the hand-held power tool is automatically activated. This process is expediently carried out in full only when the operating switch remains operated until the contact pressure has exceeded the prespecifiable limit value.

Provision is particularly preferably made for the hand-held power tool to be activated immediately after a limit value is exceeded by the detected contact pressure. As a result, the workpiece is quickly processed. In particular, this makes it possible to carry out several machining processes within an extremely short period of time.

Furthermore, provision is preferably made for the hand-held power tool to be monitored for movements, in particular by means of an acceleration sensor, and for the hand-held power tool to be activated only when no critical movements are detected, in order to increase the safety of the hand-held power tool.

In particular, provision is made for the hand-held power tool to be activated only when no movements can be detected and it can be assumed that the hand-held power tool is resting on the workpiece. Furthermore, provision is preferably made for the functionality of the acceleration sensor and/or of the device to be monitored and for the hand-held power tool to be deactivated when a malfunction has been detected. This prevents the previously carried out steps for increasing the safety leading to a reliable result. If there is a malfunction, the hand-held power tool is deactivated for safety reasons in order to prevent faulty triggering of the hand-held power tool.

Provision is further preferably made for the hand-held power tool to be automatically activated once again, in particular only, when the contact pressure once again exceeds the limit value within a prespecifiable time interval. The hand-held power tool therefore carries out a further machining process only when the contact pressure once again goes beyond or exceeds the limit value. In this case, the time interval, which is measured starting from the last time the limit value was exceeded, is selected in such a way that it can be assumed that further activation of the hand-held power tool is also actually desired. If, for example, the limit value is once again exceeded only after, for example, two minutes, even though the operating switch has been continuously operated over this time period, it is preferably identified that the situation of the limit value being exceeded once again is a faulty triggering operation because it takes place too late. A further condition for triggering the hand-held power tool once again is therefore expediently also that the operating switch is held during the prespecifiable time interval. Furthermore, provision is preferably made for the hand-held power tool to be triggered once again only when the limit value is once again exceeded by the contact pressure after a prespecifiable time period. A time period after triggering or activation of the hand-held power tool within which activation does not take place once again when the contact pressure exceeds the limit value is prespecified. This ensures that accidental further activation of the hand-held power tool, for example as a result of vibration which was triggered by the previous machining process, is avoided. The time period is expediently prespecified to be shorter than the time interval. The two time periods are particularly preferably detected, so that the hand-held power tool is triggered once again only when the contact pressure exceeds the limit value after the time period has been exceeded and before leaving the time interval.

BRIEF DESCRIPTION OF THE DRAWING

The disclosure will be explained in greater detail below with reference to an exemplary embodiment. To this end:

FIG. 1 shows a simplified illustration of a hand-held power tool.

DETAILED DESCRIPTION

The FIGURE shows a simplified side view of a hand-held power tool 1, which is in the form of a nailing machine in the present case. To this end, the hand-held power tool 1 has a housing 2 which is in the form of a gun. A nail head 4 is provided at a tip 3, it being possible for nails to be inserted into a workpiece 5 through the said nail head from a magazine, not illustrated in any detail here. The nail head 4 is itself displaceably mounted as seen in its longitudinal extent, as indicated by a double-headed arrow 6. In this case, the possible displacement travel is preferably selected to be small. The nail head has an associated sensor 7 which is in the form of a pressure sensor and is situated between the nail head 4 and a housing part of the housing 2. If the nail head 4 is displaced in the direction of the sensor or of the housing 2 by the hand-held power tool 1 being forced against a workpiece by way of the nail head 4, a pressure is exerted on the sensor 7, the said pressure being detected and evaluated by a controller 8. Therefore, the sensor 7, together with the displaceable nail head 4, constitutes a device 9 for detecting the contact pressure of the hand-held power tool 1 against a workpiece 5.

The hand-held power tool 1 further has an operating switch 10 which can be manually operated by a user. The operating switch 10 is in the form of a button and is connected to the controller 8 in such a way that the controller 8 detects operation of the operating switch 10. Accordingly, the controller 8 also detects when operation of the operating switch 10 is interrupted or terminated. Operation of the operating switch 10 is, in this respect, intended to be understood to mean holding of the operating switch 10 in its operating position, this being detected by the controller 8.

Furthermore, the hand-held power tool 1 has a drive device 11 which is designed to supply the nails 12 from the magazine to the nail head 4 and to insert the said nails into the workpiece 5. This can be performed, for example, by compressed air or in an electromagnetic manner. Nail machines are known in principle from the prior art, and therefore will not be discussed in any detail at this point.

The controller 8 is designed in such a way that it detects the contact pressure which is detected by the sensor 7 after the operating switch 10 has been operated and not released again. If the detected contact pressure exceeds a prespecifiable limit value, the controller 8 automatically triggers a nailing process of the hand-held power tool 1, and therefore a nail is driven into the workpiece 5. If the user holds the operating switch 10 in its operated position, a further nailing process can be carried out by once again pressing the hand-held power tool 1 against a further, or the same, workpiece by way of the nail head 4. For this purpose, the user only has to again firmly press the hand-held tool 1 against the workpiece in such a way that the prespecifiable limit value is exceeded by the generated and detected contact pressure. The user can therefore quickly carry out several nailing processes in succession, without releasing the operating switch 10.

In order to increase the operational reliability, at least one acceleration sensor 13 is also advantageously provided on the housing 2 of the hand-held power tool 1. The acceleration sensor 13 serves to detect movements of the housing 2. The controller 8 evaluates the data or measurement values from the acceleration sensor 13 in order to identify whether the hand-held tool 1 is being held steady or is being moved. The above-described process for triggering a machining process is carried out only when the hand-held power tool 1 is being held steady. Therefore, if the hand-held power tool 1 is being held steady, a nail 12 is inserted in the manner described above. If, however, it is identified that accelerations, which suggest unsteady movement or actual movement of the hand-held power tool 1, are acting on the hand-held power tool 1, the machining process (nailing process) is not enabled. Misuse of the hand-held power tool 1 and incorrect operation are avoided as a result.

Provision may also be made for the controller 8 to monitor the acceleration sensor 13 and the device 7 for malfunctions, and to enable the nailing process only when no malfunctions have been detected. As soon as a malfunction is detected, operation of the hand-held power tool 1 is totally deactivated and a corresponding warning message is preferably output to the user, so that the said user can deal with remedying the malfunction. In addition, provision is preferably made for the hand-held power tool 1 to be activated once again only when the detected contact pressure exceeds the prespecifiable limit value after a first prespecifiable time period has elapsed and before a time interval which is longer than the time period elapses, and in particular the operating switch 10 has been operated without interruption up until that point.

What is claimed is:

1. A hand-held power tool, comprising:
a housing having a tip;
a pressure detecting device comprising:
- a head that extends from the tip, wherein the head is displaceable relative to the housing and is configured to receive a fastening element from a magazine;
- a pressure sensor situated between the head and a portion of the housing, wherein pressure is exerted on the pressure sensor when the head is pressed onto a workpiece and displaced toward the housing;
- wherein the pressure detecting device is configured to detect a contact pressure which corresponds to the pressure exerted on the pressure sensor;

a drive device configured to drive the fastening element through said head and into a workpiece;
an operating switch configured to be manually moved to an operating position by a user of the hand-held power tool;
at least one acceleration sensor; and
a controller configured to:
- activate the hand-held power tool depending on output of the at least one acceleration sensor;
- begin monitoring the contact pressure detected by the pressure detecting device in response to the operating switch being moved to the operating position;
- continue to monitor the contact pressure while the operating switch remains in the operating position and (ii) the contact pressure is lower than a predefined limit value,
- automatically activate the drive device to drive the fastening element when the detected contact pressure increases above the predefined limit value while the operating switch is being held in the operating position and only when the at least one acceleration sensor indicates that the hand-held power tool is not being moved, and
- wherein, over a time interval during which the operating switch is held continuously in the operating position, perform at least a first actuation and a second actuation of the drive device to drive a first fastening element and a second fastening element, respectively, wherein the first actuation is performed a first time the detected contact pressure exceeds the predefined limit value during the time interval, and the second actuation is performed the second time the detected contact pressure exceeds the predefined limit value during the time interval.

2. The hand-held power tool according to claim 1, wherein the controller checks the functionality of one or more of the at least one acceleration sensor and the pressure detecting device and deactivates the hand-held power tool when a malfunction has been detected.

3. The hand-held power tool according to claim 1, wherein the hand-held power tool is configured as a riveting machine, a nailing machine, or a drywall screwdriver.

4. A method for operating a hand-held power tool, the method comprising:
providing the hand-held power tool of claim 1;
monitoring the operating switch to determine when the operating switch is moved to the operating position using the controller of the hand-held operating tool, the controller being configured to actuate the drive device to drive the fastening element;
begin monitoring the contact pressure on the head detected by the pressure detecting device with the controller in response to the operating switch being moved to the operating position;
continuing to monitor the contact pressure with the controller over a time interval during which the operating switch is held continuously in the operating position:
automatically activating the drive device to drive a first fastening element when the controller determines that the contact pressure on the head has exceeded the predefined limit value a first time during the time interval; and
automatically activating the drive device to drive a second fastening element when the controller determines that the contact pressure on the head has exceeded the predefined limit value a second time during the time interval, wherein the activating depends on output of the at least one acceleration sensor.

5. The method according to claim 4, wherein the drive device is activated without delay after the predefined limit value is exceeded by the detected contact pressure.

6. The method according to claim 4, wherein the hand-held power tool is monitored for movements, and wherein the drive device is activated depending on a type of movement detected.

7. The method according to claim 6, wherein one or more of the pressure detecting device and the at least one acceleration sensor are monitored for malfunctions, and wherein the hand-held power tool is deactivated when a malfunction has been detected.

8. The method according to claim 4, wherein the drive device is automatically activated once again when the contact pressure once again exceeds the predefined limit value within a predefined time interval.

* * * * *

UNITED STATES PATENT AND TRADEMARK OFFICE
CERTIFICATE OF CORRECTION

PATENT NO. : 10,850,377 B2
APPLICATION NO. : 14/673755
DATED : December 1, 2020
INVENTOR(S) : Steurer Page 1 of 1

It is certified that error appears in the above-identified patent and that said Letters Patent is hereby corrected as shown below:

In the Claims

In Claim 1, at Column 5, Lines 28-29: "the operating position and (ii) the contact pressure" should read --the operating position and the contact pressure--.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*